United States Patent Office 3,720,445
Patented Mar. 13, 1973

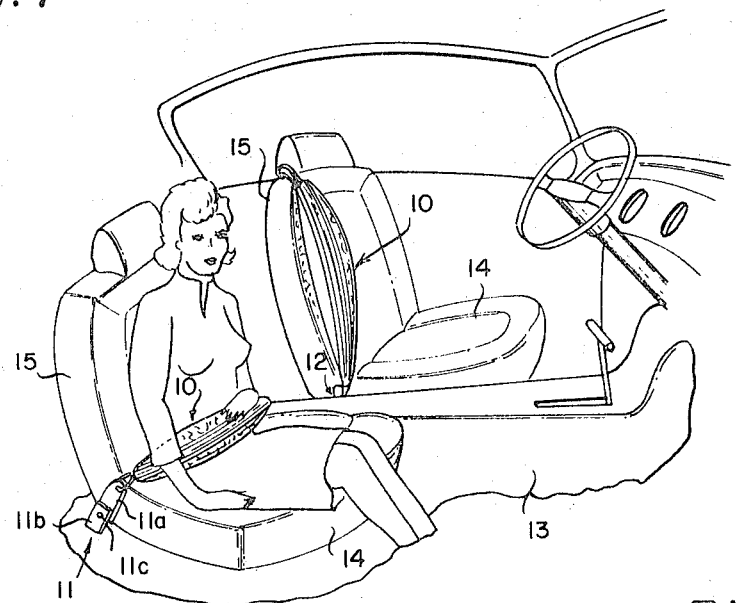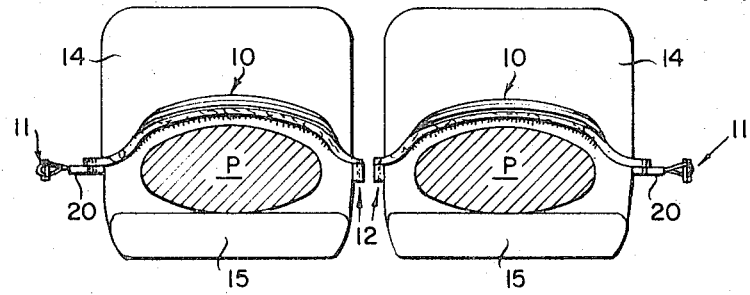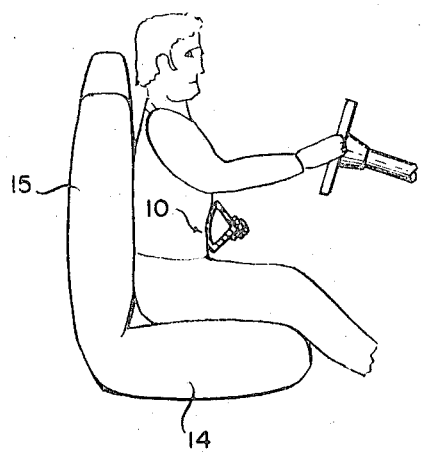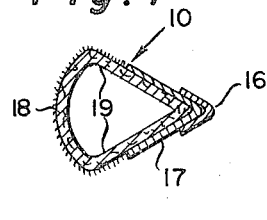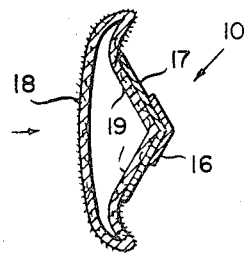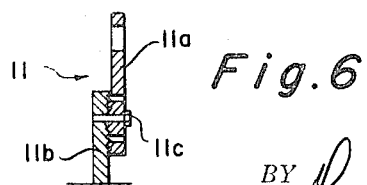
INVENTOR.
Norman Bennett
BY
ATTORNEY

3,720,445
PASSENGER RESTRAINT BARRIER
Norman Bennett, 9900 E. Bexhill Drive,
Kensington, Md. 20795
Filed Nov. 3, 1971, Ser. No. 195,298
Int. Cl. A62b 35/60
U.S. Cl. 297—390
11 Claims

ABSTRACT OF THE DISCLOSURE

Passenger injury on sudden stoppage of an automobile is prevented by a barrier placed horizontally across the passenger's seat, against which barrier the passenger's body is forcibly projected by its momentum. The barrier has an impact cushion engageable by the passenger's body in a manner to cushion the initial shock and at the same time to decelerate progressively the momentum of the passenger's body, and to arrest its further forward motion at a point well short of contact with the windshield.

BACKGROUND

The field of the present invention is the art of passenger restraint means for preventing bodily injury upon sudden, unexpected stoppage of an automobile.

The prior art relies mainly upon seat belts and various forms of air bags which function to prevent a front seat passenger's body from being thrown forcibly against the windshield of an automobile when the vehicle is brought abruptly to a sudden stop. Seat belts, because of their comparatively unyielding nature, can bring about abdominal and pelvic injury to persons using them, and air bags are vulnerable to fortuitous puncture.

SUMMARY OF THE INVENTION

The present invention is a semi-rigid, resilient barrier so constructed and arranged that, when in use, it extends horizontally across the front of a passenger's seat in such position that it prevents forward catapulting ejection of a passenger from the seat upon sudden stoppage of a vehicle in which the passenger is riding. The barrier is a composite structure constituted of a main, slightly resilient, metal backing bar of angle cross section which mounts in its angle a V-shaped intermediate resilient metal strap in nested relation between its sides, and a passenger body engageable and compressible impact cushion that distorts under passenger body pressure and progressively forces apart the side of the V-shaped intermediate strap against the combined resilience resistance of the backing bar and the intermediate strap. The combined resistances of these elements decelerate the forward momentum of the passenger's hurtling body and stops it before it can contact the windshield. The deceleration is accomplished gradually and smoothly, with full absorption of the impact shock, so that the forward movement of the passenger's body is not stopped with an abrupt jerk, which would be the case if a conventional seat belt were used.

DESCRIPTION OF THE DRAWINGS

FIG. 1 is an interior elevational view of the front seat section of an automobile equipped with the passenger restraint barrier of the present invention.

FIG. 2 is a top plan view of the seat and barrier arrangement illustrated in FIG. 1.

FIG. 3 is a side elevation of a driver's seat, showing the service position of the barrier in relation to the body of the driver.

FIG. 4 is a cross sectional view of the barrier prior to compression of the impact cushion.

FIG. 5 is a cross sectional view of the barrier with the impact cushion in distorted position following impact.

FIG. 6 is a fragmentary detail view illustrating the height adjustable connection between the sections constituting the barrier end supports.

DESCRIPTION OF PREFERRED EMBODIMENT

The barrier, indicated generally as 10, extends horizontally across the open front of a passenger seat 14 when in use so that a passenger P occupying the seat is confined by frictional contact between the barrier and the back 15 of the seat. Rigid vertical support standards 11 and 12 fixed to the vehicle floor 13 adjacent the sides of the seat maintain the barrier in service position when in use. The inner support 12 is in pivotal connection at its upper end with the inner end of the barrier. This connection enables the barrier, which normally rests on the seat when it is not occupied, to be swung up and out of the way when the seat is to be occupied, after which it may be lowered to service position. The outer, normally free, end of the barrier carries a fastening element 20, here shown as a snap hook, for detachable engagement with an aperture in the upper end of the outer support 11.

As shown in FIG. 6, the support 11 comprises a vertically adjustable upper section 11a, and a lower section 11b that is permanently secured to the floor 13 by any conventional attachment (not shown). The sections are in slidable side by side relation with mutually engageable serrations on the overlapping faces of their connecting end portions. A pin 11c passed through a bore in the upper end portion of the lower section 11b is selectively engageable in one of a longitudinal series of holes in the lower end portion of the upper section 11a and provides a connection which enables the height of the barrier 10 to be adjusted to suit the convenience of a person occupying the seat. The same adjustable section structure is employed for the inner support 12.

The barrier itself is a composite structure consisting of a slightly resilient metal bar 16 of angle cross section to which is secured an intermediate strap 17 of vertical V-shape cross section to which, in turn, there is secured an impact cushion comprising a hollow tubular bolster substantially triangular cross section and having a convex rear wall 18 with substantially flat top and bottom walls 19 forwardly convergent to meet in a wedge-shaped nose that is nested between the complemental sides of the intermediate strap 17. In this assembly the side walls of the bar 16, the intermediate strap 17, and the walls 19 of the impact cushion all converge in a common direction forwardly from the convex rear wall 18 of the input cushion. The impact cushion, which comprises the convex rear wall 18 and the convergent top and bottom walls 19, is made of a pliable material having the property of elastic memory, so that after deformation it returns to its original shape. The material from which the impact cushion bolster is made is not critical, but it must be of such nature that the walls 18 and 19 are sufficiently thick to provide substantial resistance to distortion from their original shape prior to compression under impact force pressure. One example of suitable material for the impact cushion is a rubber backed creslan acrylic pile carpet similar to that available on the open market, but thicker in cross section. The impact cushion is not an air bag, but it may contain one in its hollow interior if such be desired. It is preferred that the bar 16 be forwardly bowed as seen in FIG. 2, with the other elements conforming in shape.

The top to bottom width of the barrier is preferably greatest at its mid-portion as shown in FIG. 1, being about six inches, from which point it tapers gradually to its ends.

An important aspect of the present invention is the fact that the intermediate strap 17 is more resilient than the bar 16, so that its sides may be forced apart by pressure exerted by the impact cushion in a manner to effect a camming action against the less resilient sides of the angle bar 16 to propel that bar forwardly against the resistance afforded by the bias of its resilience. The same camming action, occurs between the nose junction of the impact cushion walls 19 and the sides of the V-shaped intermediate strap 17.

MODE OF OPERATION

When the barrier is disposed in service (safety) position it extends horizontally across and preferably slightly above the lap of a person occupying the seat. In this position the convex rear wall 18 of the impact cushion bears against the body of the seat occupant. Upon impact, the forward momentum of the seat occupant forces his body forwardly against the rear wall 18 of the impact cushion, thereby carrying the cushion forwardly and at the same time distorting it so that it absorbs some of the impact shock and transfer the remainder to the intermediate strap 17. Compression of the impact cushion between the forwardly moving body of the seat occupant and the strap 17 and bar 16 distorts the cushion to the configuration shown in FIG. 5 in which the cushion walls 19 are forced apart against the resistance imparted by the resilience bias of the strap 17 sides, which progressively expand further apart against the resistance imparted by the heavier resistance bias of the angle bar 16. Continued forward movement of the impact cushion and the intermediate strap 17 against the spring bias resistance of the bar 16, which acts as a bow, progressively decelerates and then stops further foward movement of the seat occupant's body well short of contact against the vehicle windshield and without injury to the occupant.

During forward travel of the barrier 10 assembly its rate of progress is progressively slowed and stopped by the progressively increasing resistance imparted sequentially by the impact cushion, the intermediate strap 17 and the main bar 16, all of which ultimately combine in a forward pressure surge which, because the ends of the barrier are anchored, increases the bow curve of the barrier against the tension of its bias and thereby adds a further increment of resistance to forward movement of the barrier, which additional resistance increases progressively as the bow is flexed.

A further safety factor in the present invention is the fact that under conditions of extreme impact the upper and lower edges of the impact cushion will be pushed over and cover the corresponding edges of the intermediate strap 17, as shown in FIG. 5, thereby protecting the seat occupant against injury by the strap.

It is desirable that the contoured shape of the barrier 10 allow for restraint of pelvic motion, after initial compression of the cushion 18 has begun.

I claim:
1. Passenger restraint barrier means comprising, in combination:
    (a) a floor-attached vehicle seat;
    (b) a bar across the front of the seat;
    (c) a floor-attached bracket at each side of the seat and having its upper end portion terminating in a connection with the adjacent end of the bar at approximately the level of the seat for supporting the ends of the bar in fixed relation to the seat;
    (d) and passenger body momentum decleration means carried by the bar in a position facing the seat.
2. Passenger restraint barrier means comprising:
    (a) a forwardly bowed resilient metal bar substantially V-shaped in cross section for placement across the front of an automobile seat;
    (b) means for anchoring the ends of the bar against movement forwardly from the seat;
    (c) means on the bar operative to cushion the impact of a passenger's body projected forwardly or sidewise thereagainst;
    (d) a resilient metal strap of V-shape cross section interposed between the bar and the impact cushion with the point of the strap nested in the angle of the bar;
    (e) the resilience of the strap being greater than the resilience of the bar;
    (f) and the impact cushion including means for forcing the convergent sides of the interposed strap away from each other progressively against the resistance imparted by the resilience bias of the strap.
3. In the barrier of claim 2, separation of the sides of the interposed strap being in opposition to the increased resistance imparted by the lesser resilience bias of the bar.
4. In the barrier of claim 2, said cushion means being a tubular member approximately triangular in cross section and constituted of a material having the property of elastic memory, the apex portion of said substantially triangular cross section member being nested between the sides of said interposed strap, and the base of said substantially triangular cross section member being a convex wall engageable by the body of a passenger when forcibly projected from the seat.
5. In the barrier of claim 2, said means for forcing the convergent sides of the intermediate strap away from each other being a member oblong in cross section and having the property of elastic memory, one axis of the member lying in a substantially horizontal plane that bisects the angle of said bar.
6. In the barrier of claim 5, said axis of the member being its major axis.
7. In the barrier of claim 4, said convex wall being deformable under impact to extend beyond and over the top and bottom edges of said interposed strap.
8. Passenger restraint barrier means comprising:
    (a) a resilient metal bar for placement transversely across the front of a vehicle seat;
    (b) means for anchoring the bar against movement in its entirety forwardly from a seat which it may be associated;
    (c) means carried by the bar and operative to cushion the impact of a person's body projected thereagainst;
    (d) a resilient metal strap of substantially V-shaped cross section interposed between the bar and the impact cushion with the apex of the V abutting the bar intermediate the top and bottom thereof;
    (e) and the impact cushion having a portion engaged between the convergent sides of the V-shaped strap and operative by the impact cushion during forward movement thereof to force the convergent sides of the strap away from each other progressively against the resistance imparted by the resilience of the strap.
9. In the barrier of claim 8, the resilience of bar being less than the resilience of the strap, whereby the bar imposes progressively increasing resistance to forward movement of the strap.
10. Passenger restraint barrier means comprising:
    (a) a resilient metal angle bar for placement transversely across the front of a vehicle seat in a fixed relation thereto preventing bodily movement of the bar in its entirety forwardly from the seat;
    (b) an impact cushion carried by the bar in a position facing the seat and deformable against the bar under impact of a person's body when projected forwardly against the cushion;
    (c) and means interposed between the bar and the cushion operative to dissipate progressively the kinetic energy generated by impact of a person's body against the cushion.
11. Means for dissipating and progressively decreasing the kinetic energy force generated by projection of a person's body forwardly from a vehicle seat incident to the sudden stoppage of the vehicle, which comprises the combination of:
(a) a first means constructed and arranged to receive and cushion the direct impact of a person's body projected thereagainst and to transmit the force of the impact to a second means forwardly thereof;
(b) the second means being a resilient member deformable against the bias of its resilience under the force transmitted by said first means to provide progressively increasing resistance to further transmission of force;
(c) said second means being operative under force transmitted from the first means to further increasingly resist further transmission of that force and diminish it by spreading it over a greater area of resistance than that afforded by the first means;
(d) and a third means in contact with the second means forwardly thereof and operative to counteract and increasingly dissipate the force transmitted by said second means in excess of the force counteracted by the first and second means.

References Cited
UNITED STATES PATENTS

| | | | |
|---|---|---|---|
| 3,232,665 | 2/1966 | Von Wimmersberg | 297—390 X |
| 3,635,526 | 1/1972 | Posey | 297—390 |

FOREIGN PATENTS

| | | | |
|---|---|---|---|
| 1,307,758 | 9/1962 | France | 297—390 |
| 1,008,155 | 2/1952 | France | 297—390 |

JAMES T. McCALL, Primary Examiner

U.S. Cl. X.R.

297—384